United States Patent
Kasahara

(10) Patent No.: US 10,787,013 B2
(45) Date of Patent: Sep. 29, 2020

(54) MANUFACTURING METHOD FOR PRINTED MATTER WITH THREE-DIMENSIONAL PATTERN

(71) Applicant: MIMAKI ENGINEERING CO., LTD., Nagano (JP)

(72) Inventor: Junki Kasahara, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 36 days.

(21) Appl. No.: 16/147,907

(22) Filed: Oct. 1, 2018

(65) Prior Publication Data

US 2019/0111718 A1    Apr. 18, 2019

(30) Foreign Application Priority Data

Oct. 16, 2017 (JP) .................................. 2017-200279

(51) Int. Cl.
  *B05D 3/12* (2006.01)
  *B29C 70/68* (2006.01)
  (Continued)

(52) U.S. Cl.
  CPC ......... *B41M 5/0076* (2013.01); *B29C 64/106* (2017.08); *B29C 64/112* (2017.08);
  (Continued)

(58) Field of Classification Search
  CPC ....... B05D 3/12; B29C 64/106; B29C 64/112; B29C 67/007; B29C 70/68; B29C 70/682;
  (Continued)

(56) References Cited

U.S. PATENT DOCUMENTS

| 6,613,388 B1* | 9/2003 | Kashiwabara | ......... B41M 5/506 427/358 X |
| 2011/0310204 A1* | 12/2011 | Ohnishi | ............... B41M 7/0081 347/102 |

FOREIGN PATENT DOCUMENTS

| CN | 105636788 | 6/2016 |
| JP | 2004314515 | 11/2004 |
| JP | 2017185825 | 10/2017 |

OTHER PUBLICATIONS

"Search Report of Europe Counterpart Application," dated Mar. 14, 2019, p. 1-12.

(Continued)

*Primary Examiner* — Leo B Tentoni
(74) *Attorney, Agent, or Firm* — JCIPRNET

(57) ABSTRACT

Provided is a manufacturing method for a printed matter including a medium and a three-dimensional pattern printed on a surface of the medium. The three-dimensional pattern has a partly-coated resin portion and further has layers including a colored layer and clear layers formed on the colored layer. The three-dimensional pattern is formed by stacking the layers formed of inks at least containing resin on one another. One of the clear layers formed on an outermost surface of the three-dimensional pattern is flattened for a longer duration than at least one of the other one of the clear layers and the colored layer that are formed below the clear layer on the outermost surface, so that the one of the clear layers on the outermost surface is further flattened than at least one of the other one of the clear layers and the colored layer.

10 Claims, 7 Drawing Sheets

(51) Int. Cl.
  *B29C 70/78* (2006.01)
  *B41J 3/407* (2006.01)
  *D06P 5/02* (2006.01)
  *D06P 5/30* (2006.01)
  *D06P 7/00* (2006.01)
  *B41M 5/00* (2006.01)
  *B41M 7/00* (2006.01)
  *B41M 3/06* (2006.01)
  *B29C 64/106* (2017.01)
  *B29C 64/112* (2017.01)
  *B41M 3/00* (2006.01)

(52) U.S. Cl.
  CPC ........... *B29C 70/682* (2013.01); *B41J 3/4078* (2013.01); *B41M 3/06* (2013.01); *B41M 5/007* (2013.01); *B41M 5/0047* (2013.01); *B41M 5/0058* (2013.01); *B41M 5/0064* (2013.01); *B41M 7/00* (2013.01); *B41M 7/0081* (2013.01); *B41M 3/00* (2013.01); *B41M 7/0045* (2013.01)

(58) Field of Classification Search
  CPC ......... B29C 70/78; B41J 3/407; B41J 3/4078; B41M 3/00; B41M 3/06; B41M 5/0047; B41M 5/0058; B41M 5/0064; B41M 5/007; B41M 5/0076; B41M 7/00; B41M 7/0045; B41M 7/0081; D06P 5/02; D06P 5/30; D06P 7/00
  USPC ....... 264/245, 255, 259, 294, 296, 308, 494; 427/355, 358; 347/101, 105, 106, 107
  See application file for complete search history.

(56) References Cited

OTHER PUBLICATIONS

"Office Action of China Counterpart Application", dated Mar. 18, 2020, with English translation thereof, p. 1-p. 15.

\* cited by examiner

MANUFACTURING METHOD FOR PRINTED MATTER WITH THREE-DIMENSIONAL PATTERN

CROSS REFERENCE TO RELATED APPLICATIONS

This application claims the priority benefit of Japanese Patent Application No. 2017-200279, filed on Oct. 16, 2017. The entirety of the above-mentioned patent application is hereby incorporated by reference herein and made a part of this specification.

TECHNICAL FIELD

This disclosure relates to a manufacturing method for a printed matter with a three-dimensional pattern.

DESCRIPTION OF THE BACKGROUND ART

There have been known printing methods that form optional patterns of aggregation of granular dots on print media using Japanese lacquer mixed with ink (for example, Japanese Unexamined Patent Publication No. 2004-314515).

The printing method described in Japanese Unexamined Patent Publication No. 2004-314515 can obtain leather items in which dots of Japanese lacquer mixed with angle ink are printed in finely structured patterns on leather used as a print medium. This printing method may produce more readily manufacture products that appear to be traditional craftworks, including Japanese Inden leather items in which dyed tanned leather of sheep or deer is decorated with Japanese lacquer in distinctive patterns.

SUMMARY

In such a printing method using lacquer-containing ink, the lacquer needs to be sufficiently dried after the leather is coated with the ink. The lacquer takes time to dry and may easily crack under certain drying conditions. Thus, using the lacquer may conventionally involves a number of production issues to be addressed.

To address such issues, this disclosure provides a method for manufacturing in short time a printed matter with a three-dimensional pattern printed thereon.

To this end, this disclosure provides a manufacturing method for a printed matter including a medium and a three-dimensional pattern printed on a surface of the medium. The three-dimensional pattern has a partly-coated resin portion and further has layers including a colored layer and clear layers formed on the colored layer. The three-dimensional pattern is formed by stacking the layers formed of inks at least containing resin on one another. One of the clear layers formed on an outermost surface of the three-dimensional pattern is flattened for a longer duration than at least one of the other one of the clear layers and the colored layer that are formed below the clear layer on the outermost surface, so that the one of the clear layers on the outermost surface is further flattened than at least one of the other one of the clear layers and the colored layer.

According to the manufacturing method thus configured, the three-dimensional pattern may have a glossy surface by flattening at least its surface on the outermost surface for a longer duration. Flattening a layer immediately below the outermost layer is not necessarily taken into account in order to impart glossiness to the outermost surface because of less impact of time to flatten this layer on the whole operating time. The operating time, therefore, may be shortened by reducing time consumed to flatten the layer immediately below the outermost layer, as compared with the outermost layer.

The resin may be an ultraviolet-curable resin.

The ink containing the ultraviolet-curable resin, when irradiated with ultraviolet light immediately after landing of the ink on the medium, may be cured before being flattened and may certainly have an adequate height, and thus suitable for the printed matter to be manufactured in short time.

The colored layer or the clear layers are formed by an inkjet printer. The manufacturing method may include adjusting the intensity of ultraviolet radiation or the length of time before the ultraviolet-curable resin starts to be irradiated with ultraviolet light emitted from an ultraviolet irradiator after the ink that forms the colored layer or the clear layers is ejected to the surface of the medium.

This configuration may allow one of glossy printing and matte printing to be easily selected and performed.

The medium may have flexibility.

Such a medium may allow a printed matter decorated with an Inden-ish three-dimensional pattern to be manufactured without using any real animal leather.

A background layer vertically lower than an apex of the three-dimensional pattern may be formed on the surface of the medium as background of the three-dimensional pattern.

This may provide a difference in height between the three-dimensional pattern and the background layer, facilitating the formation of an Inden-ish three-dimensional pattern.

The background layer may have a surface with an animal leather bonded thereto or have a surface with an animal leather-ish texture imparted thereto by inkjet printing.

According to this configuration, a printed matter with an Inden-ish three-dimensional pattern, like the traditional Japanese craftworks, may be easily manufactured by printing the background layer by inkjet printing without using any real animal leather, or more Inden-ishness may be imparted to the printed matter by bonding a real animal leather to the surface of the background layer. In addition, color change of the background layer may be facilitated.

The three-dimensional pattern that appears Inden-ish may be formed on an animal leather used as the medium or on the surface of the medium with an animal leather-ish texture expressing the surface of an animal leather.

The printed matter using such a medium and having the three-dimensional pattern printed thereon may readily appear more Inden-ish.

The surface of the printed matter may be coated with the three-dimensional pattern by a ratio between 15% and 30% per unit area.

According to this configuration, patterns expressible with Japanese lacquer in the Inden craftworks may be exactly expressed, and a really Inden-ish printed matter may be successfully manufactured.

The three-dimensional pattern includes a plurality of the colored layers constructed of repetitive basic patterns and the clear layers formed on the plurality of the colored layers. The basic pattern may be formed so that the printed matter is coated with the basic pattern by a ratio between 0.5% and 3.0% per the unit area, with standard deviation ranging from 0.5% to 1.5%.

According to this configuration, variability in size between individual patterns constituting the whole three-dimensional pattern may be relatively small. The printed matter in whole may be accordingly decorated with the patterns substantially uniform in size.

The colored layer may be formed so that, in a respective one of individual patterns constituting the whole three-dimensional pattern, lightness of the colored layer increases from a peripheral part of the colored layer in plan view toward an inner part than the peripheral part.

According to this configuration, any three-dimensional pattern relatively flat, for example, may appear more three-dimensional.

According to this disclosure, a printed matter with an Inden-ish three-dimensional pattern printed thereon may be manufactured in short time.

BRIEF DESCRIPTION OF THE DRAWINGS

FIG. 1A is a plan view of a printed matter on which individual patterns constituting a whole three-dimensional pattern are independent from one another. FIG. 1B is a plan view of a printed matter on which individual patterns constituting a whole three-dimensional pattern are continuous to one another.

FIG. 5A illustrates the steps of forming the colored layer and the background layer. FIG. 5B illustrates the step of forming the matte clear layer. FIG. 5C illustrates the step of the glossy clear layer.

DETAILED DESCRIPTION OF EMBODIMENTS

A preferred embodiment of this disclosure is hereinafter described referring to the accompanying drawings. The embodiment below is described herein by way of an example and may be variously modified within the scope of this disclosure.

<Configuration of Printed Matter with Three-Dimensional Pattern Printed Thereon>

Figure 1A:
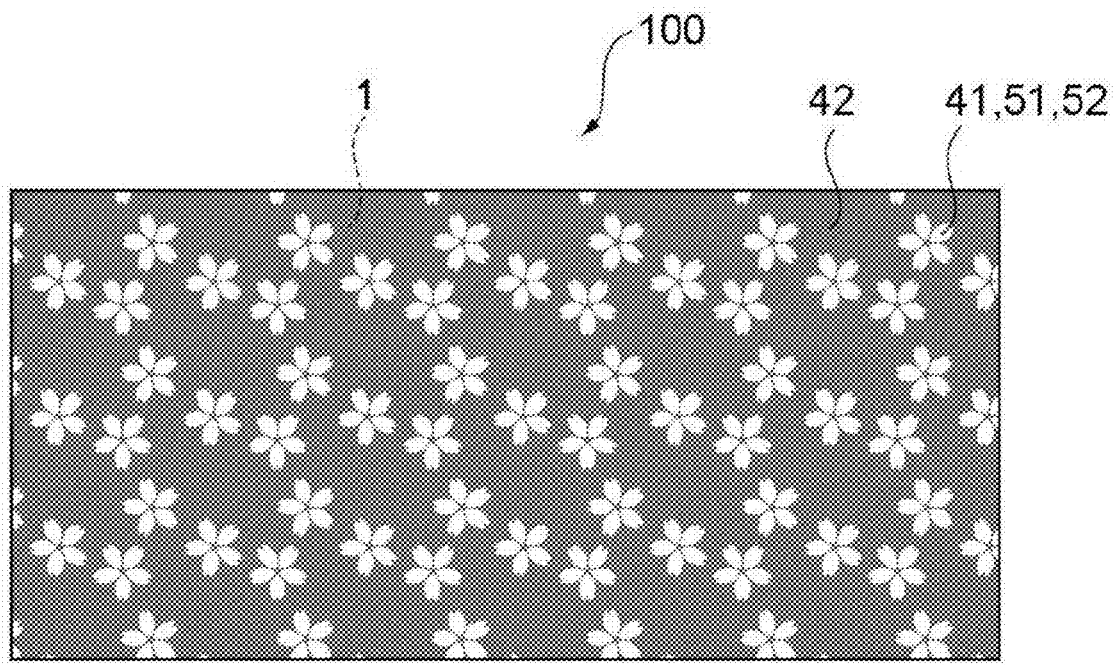
FIGS. 1A to 1B are plan views of examples of a printed matter with a three-dimensional pattern printed thereon.
Figure 1B:
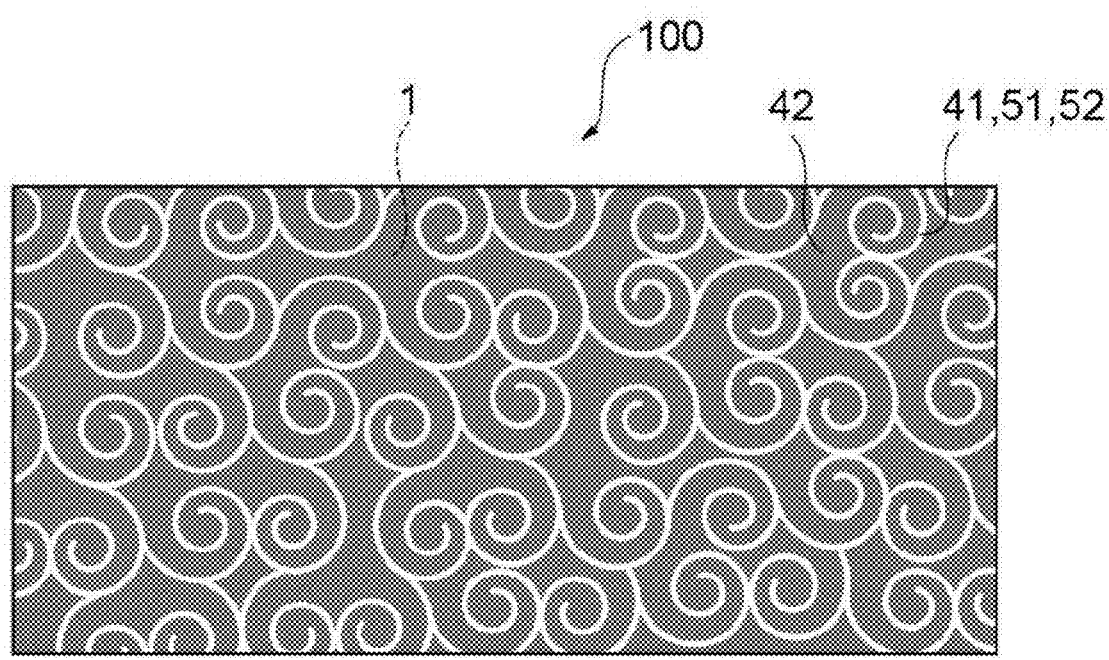
Figure 2:
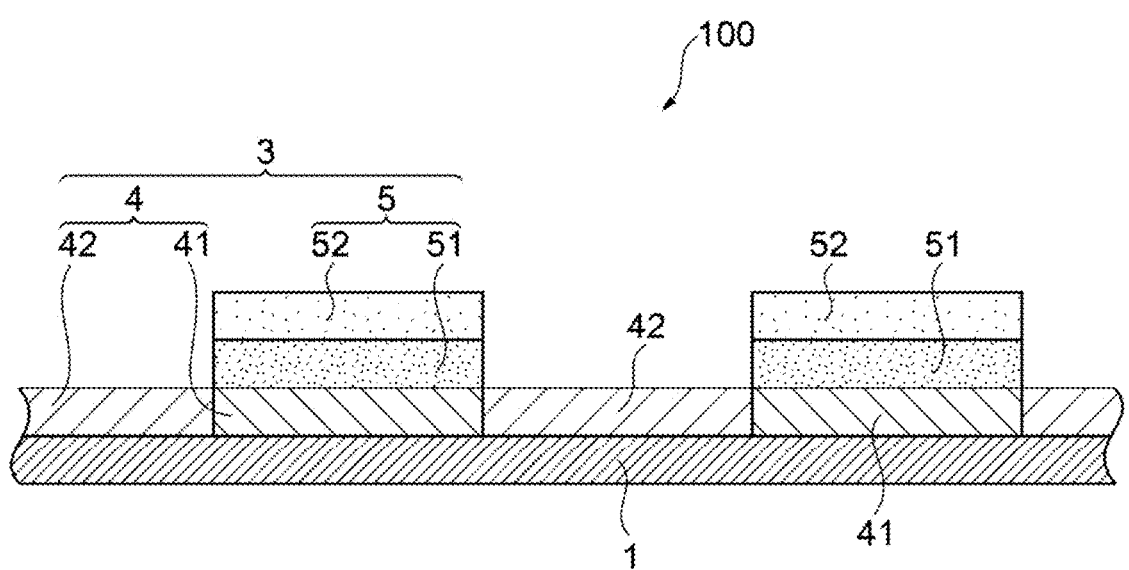
FIG. 2 is a schematic cross-sectional view of the printed matter.

FIGS. 1A to 1B are plan views of printed matters with three-dimensional patterns printed thereon. FIG. 1A is a plan view of a printed matter on which individual patterns constituting a whole three-dimensional pattern are independent from one another. FIG. 1B is a plan view of a printed matter on which individual patterns constituting a whole three-dimensional pattern are continuous to one another. FIG. 2 is a schematic cross-sectional view of a printed matter with a three-dimensional pattern printed thereon.

As an example of predetermined three-dimensional patterns printable on printed matters as illustrated in FIG. 1, a printed matter 100 has a three-dimensional pattern expressed with flower petals. As illustrated in FIG. 2, the printed matter 100 includes a medium 1, and a plurality of ink layers 3 formed on the medium 1.

[Medium]

The three-dimensional pattern is formed on the medium 1. The medium 1 may be selected from materials having flexibility, for example, leathers obtained from animals such as cow, horse, pig, sheep, deer, alligator, and snake, synthetic leathers, paper, and fabric. The medium 1 is not necessarily limited to these materials, and may be any one selected from, for example, wooden boards, metal boards, non-metal boards, and synthetic resin boards, insofar as inkjet printing can be performed.

[Ink Layer]

As illustrated in FIG. 2, the ink layer 3 includes a colored layer portion 4, and a clear layer portion 5 composed of a plurality of layers.

(Colored Layer Portion)

The colored layer portion 4 is formed by ejecting different color inks; cyan, magenta, yellow, white, and black color inks onto the medium 1. The inks used to form the colored layer portion 4 are ultraviolet-curable color inks. The color ink may contain an ultraviolet-curable resin and a colorant and may be curable through chemical reactions of the ultraviolet-curable resin under ultraviolet radiation.

As illustrated in FIG. 1A, the colored layer portion 4 includes a plurality of colored layers 41 spaced apart on the medium 1, and a background layer 42 formed at a position of the medium 1 where the colored layers 41 are not formed.

As illustrated in FIG. 1, the colored layers 41 express flower petals constituting a flower pattern, and the colored layers 41 printed at appropriate positions constitute the whole flower pattern. The colored layers 41 may each express a flower pattern and may be put together to express a larger flower pattern or any other pattern.

The colored layers 41 may be formed by ejecting the color inks to a surface of the medium 1. The color arrangement of the colored layers 41 may be selectively decided based on the concept of a pattern desirably printed.

The background layer 42 is formed at a position of the medium 1 where the colored layers 41 are not formed. The background layer 42 is formed in a manner that differs from the colored layer 41. The "background layer 42 being formed in a manner that differs from the colored layer 41" means that the background layer 42 differs in shape from the colored layer 41, and more specifically means that the background layer 42 is so shaped as to fill any part of a region with no colored layer 41 where the surface of the medium 1 is exposed.

As illustrated in FIG. 2, the background layer 42 is formed, as background, on the surface of the medium at a position vertically lower than an apex of the three-dimensional pattern, i.e., at a position lower than the apex in a thickness direction of the printed matter 100. The background layer 42 may be colored or not colored. Further, different color concentrations may be used between the background layer 42 and the colored layers 41 so as to visually recognize distinction between the layers 42 and 41.

A color ink may be applied onto the surface of the medium 1, so that the surface of the background layer 42 has a leather-ish texture expressing the surface of a real animal leather. The background layer 42 in a region with no colored layer 41 may be unnecessary, leaving the surface of the medium 1 left exposed. In this instance, there is a predetermined level of contrast between the clear layer 5 described later and a part of the medium 1 left exposed with no layer formed thereon, allowing the exposed part to serve as background.

The colored layer 41 and the background layer 42 are uniform in thickness and are flush with each other.

The colored layers 41 of the colored layer portion 4 may constitute an arabesque pattern, as illustrated in FIG. 1B. In this drawing, the arabesque pattern is expressed by forming linear colored layers 41 on the whole surface of the medium 1, in which the colored layers 41 are formed as one entity.

(Clear Layer Portion)

The clear layer portion 5 is formed on the colored layer 41 with a colorless ultraviolet-curable clear ink having transparency. The clear ink may contain an ultraviolet-curable resin and may be curable through chemical reactions of the ultraviolet-curable resin under ultraviolet radiation.

The clear layer portion 5 has a plurality of layers 51 and 52 stacked on each other. In the clear layer portion 5, the layers 51 and 52 are inseparable, with substantially no indication of a boundary between the layers 51 and 52. The layers 51 and 52 are, however, distinct from each other because of their different manufacturing methods and functions as described below.

Specifically, the clear layer portion 5 includes the matte clear layer 51 formed on the colored layer 41, and the glossy clear layer 52 (outermost clear layer) formed on the matte clear layer 51. The glossy clear layer 52 formed at the uppermost position of the ink layer 3 constitutes the outermost surface of the clear layer portion 5.

In the printed matter 100, the colored layers 41 are formed as underlayer and the clear layers 51 and 52 as upperlayer are formed on the colored layers 41, which constitute a three-dimensional pattern.

<Manufacturing Method for Printed Matter with Three-Dimensional Pattern Printed Thereon>

A manufacturing method for the printed matter 100 is hereinafter described referring to FIGS. 3 to 6.

Figure 3:
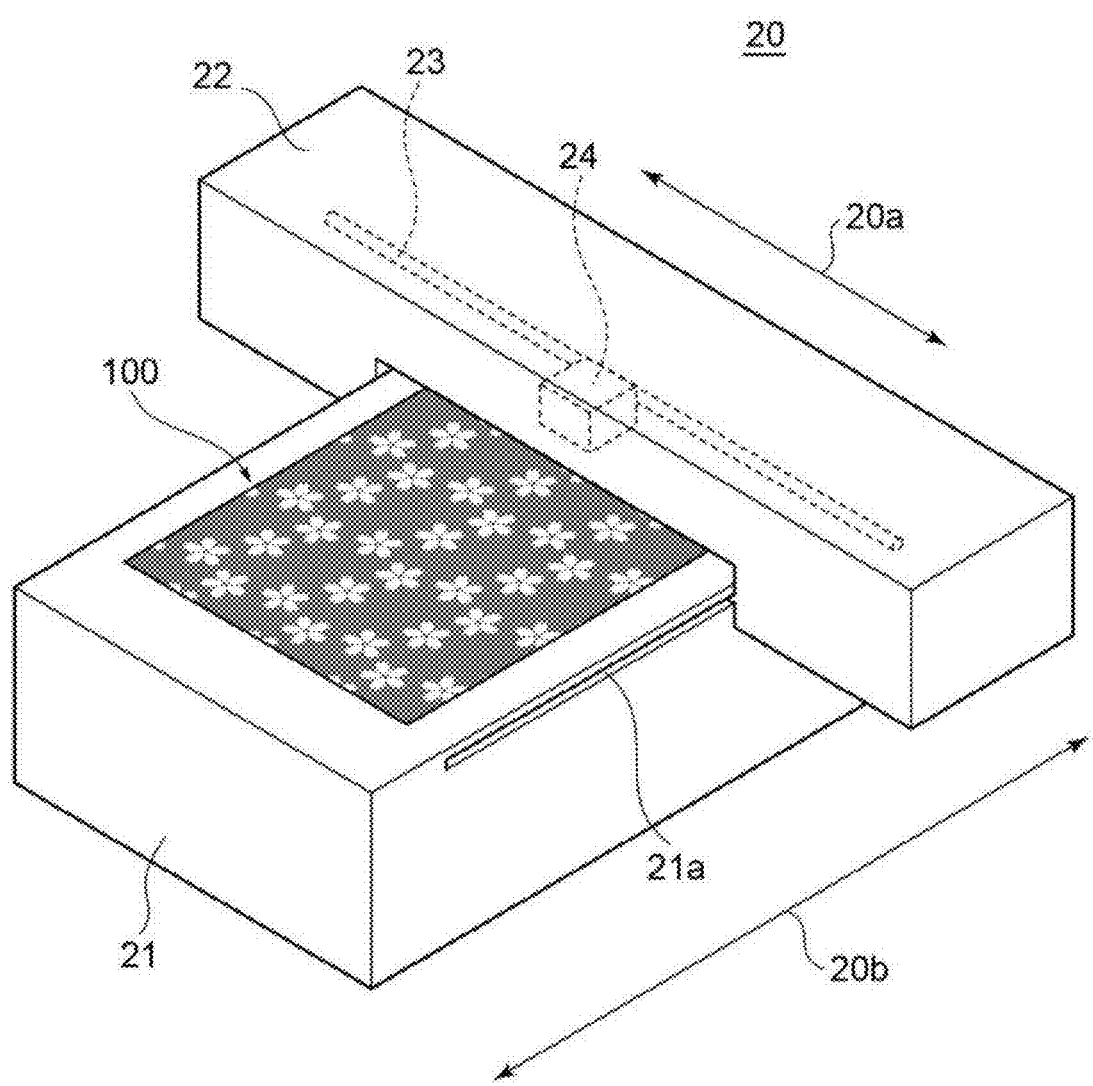
FIG. 3 is a perspective view of an inkjet printer used to manufacture the printed matter.
Figure 4:
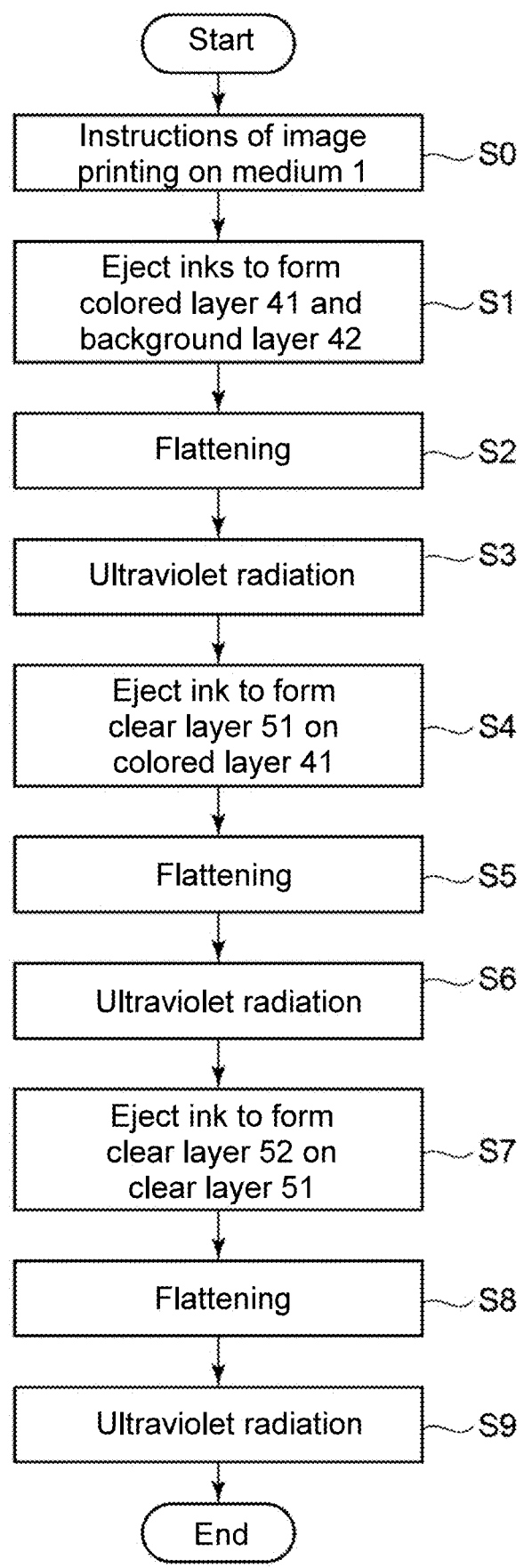
FIG. 4 is a flowchart of steps of manufacturing the printed matter.
Figure 5A:
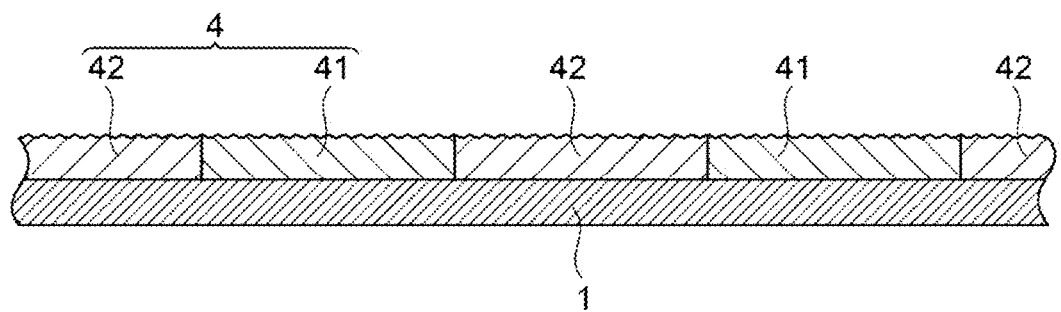
FIGS. 5A to 5C are drawings that illustrate structures of a colored layer and a clear layer in the steps of manufacturing the printed matter.
Figure 5B:
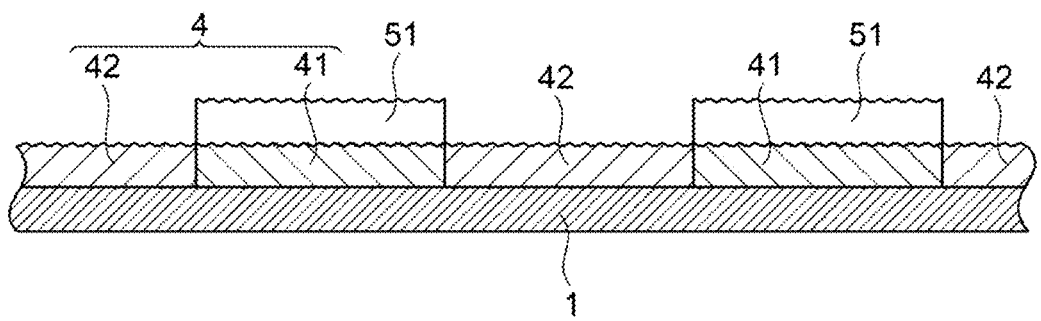
Figure 5C:
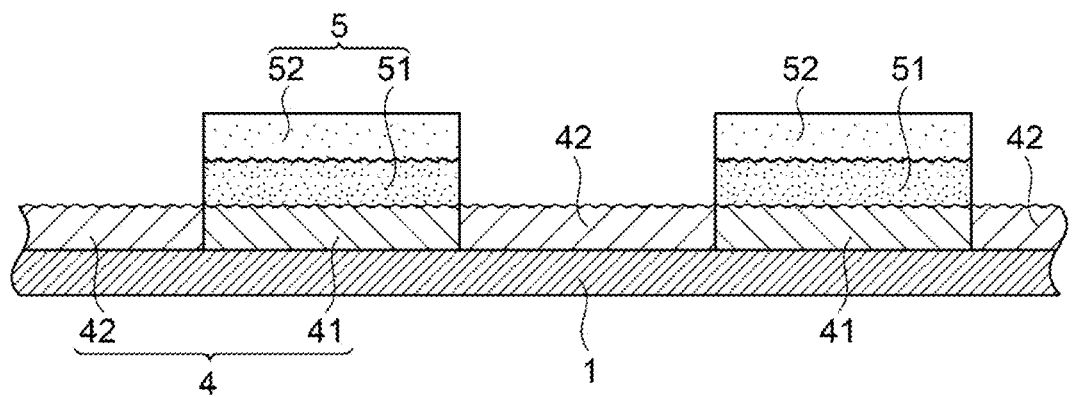
Figure 6:
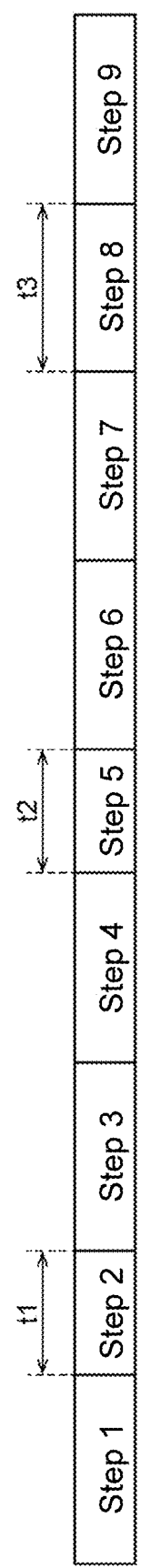
FIG. 6 is a drawing that illustrates comparison of lengths of flattening time in the steps of manufacturing the printed matter.

FIG. 3 is a perspective view of an inkjet printer used to manufacture the examples of the printed matter illustrated in FIG. 1. FIG. 4 is a flowchart of steps of manufacturing the printed matter. FIGS. 5A to 5C are drawings that illustrate the steps of manufacturing the printed matter. FIG. 5A illustrates the steps of forming the colored layer and the background layer. FIG. 5B illustrates the step of forming the matte clear layer. FIG. 5C illustrates the step of the glossy clear layer. FIG. 6 is a drawing that illustrates comparison of lengths of ink flattening time in steps of forming the colored layer and of forming the clear layer.

While the manufacturing method for the printed matter 100 including the background layer 42 is hereinafter described, the background layer 42 may be optionally unnecessary.

An operator secures the medium 1 to a predetermined position on a table 21 of an inkjet printer 20, and then inputs to the inkjet printer 20 instructions to print an image based on an optional print data (flower pattern in this embodiment) on the medium 1 (Step S0).

The inkjet printer 20 that received the instructions moves a carriage 24 along a guide rail 23 in a main scanning direction indicated with an arrow 20a relative to the table 21 so as to print bands within a certain range in one scan. After these bands are printed, a body 22 is moved by a width corresponding to the printed bands relative to the medium 1 in a sub scanning direction indicated with an arrow 20b so as to print in a next scan some of the remaining bands adjacent to the printed bands (see FIG. 3). That is, the inkjet printer 20 moves the carriage 24 and the body 22 relative to the medium 1 secured to the table 21 based on the print data.

Optionally, the table 21 may be moved in the sub scanning direction 20b relative to the body 22.

(Colored Layer Forming Step)

As illustrated in FIGS. 4 and 5A, the inkjet printer 20 ejects ultraviolet-curable color inks from a recording head mounted in the carriage 24 toward the medium 1 secured to the table 21. Specifically, in order to form an image shaped correspondingly to the print data (for example, a plurality of flowers), the inkjet printer 20 ejects the color inks onto the medium 1 (Step S1) so as to form the colored layers 41 constituting a basic design of the three-dimensional pattern and to form the background layer 42 in any part of the medium 1 where the colored layers 41 are not formed.

In the inkjet printer 20, the color inks ejected to form the colored layers 41 and the background layer 42 are then flattened for a predetermined time t1 (approximately 0.1 sec.) (Step S2). The ejected inks spread and become flat during the predetermined time (flatting time) t1. The color inks ejected to the medium 1 and flattened thereon during the predetermined time t1 are then irradiated with ultraviolet light emitted from an ultraviolet irradiator (LED) mounted in the carriage 24 so as to form the colored layers 41 and the background layer 42 (Step S3).

In Step S3, the intensity of ultraviolet light radiated on the color inks from the ultraviolet irradiator may be adjusted. For example, the color inks may be tentatively rendered tacky, instead of being fully cured, by adjusting the intensity of ultraviolet radiation. The color inks, if tentatively rendered tacky, need to be fully cured in a subsequent curing step by further irradiating the tacky color inks with ultraviolet light.

The colored layers 41 and the background layer 42 are printed and formed in a matte mode. That is, since the recording head and the LED adjacent to the recording head are mounted in the carriage 24, droplets of the inks ejected from the recording head may be immediately fully cured by the LED.

In the matte mode, ink is ejected and cured so as to have a matte texture. The "matte" texture may indicate an uneven surface because the ink droplets that just landed on the medium are cured before they start to be flattened. The surface with such matte texture, therefore, may be significantly inferior in glossiness to a flat and glossy surface. On the other hand, the occurrence of ink bleeding may be prevented because the ink droplets are cured before possibly starting to bleed in response to any contact between the ink droplets, and the ink droplets still tacky and cured before being flattened may certainly have an adequate height. The matte mode, therefore, may be suitably employed to form the colored layers 41 (image) required to have high resolution.

There are a number of irregularities resulting from dots of the inks on the surface of the colored layer 41, which may provide an anchor effect, which will be described later, for the matte clear layer 51 formed on the colored layer 41.

As result, the medium 1 has, on its surface, the basic design of the flower pattern formed by the colored layers 41 and background formed by the background layer 42 apart from the pattern.

(Clear Layer Forming Step)

After the colored layers 41 and the background layer 42 are formed, the inkjet printer 20 ejects the clear ink onto the colored layers 41 so as to form the clear layer portion 5. The clear layer portion 5 is composed of the layers 51 and 52 formed and stacked on each other by ejecting the clear ink a plurality of times.

As illustrated in FIGS. 4 and 5B, the clear ink is ejected onto the colored layers 41 so as to form the matte clear layer 51 in the matte mode (Step S4). A number of irregularities present on the surface of the colored layer 41 may allow the ejected clear ink to accurately land on the colored layer 41 without running off the edge of the colored layer 41. Further, the clear ink may be cured sooner so as to have an adequate height and thus has excellent workability.

The ejected clear ink is flattened for a predetermined time t2 (approximately 0.1 sec.) (Step S5). Then, the clear ink spreads and becomes flat during the predetermined time (flattening time) t2. Next, the clear ink is irradiated with ultraviolet light emitted from the ultraviolet irradiator (Step S6). As a result, the matte clear layer 51 is formed. In Step S6, the intensity of ultraviolet light radiated on the clear ink from the ultraviolet irradiator may be adjusted.

As illustrated in FIG. 5C, the clear ink is ejected onto the clear ink 51 so as to form the glossy clear layer 52 at the uppermost position of the clear layer portion 5 as its outermost surface in the glossy mode (Step S7). In the presence of a number of irregularities on the surface of the matte clear layer 51, the clear ink ejected may accurately land on the matte clear layer 51 without running off the edge of the matte clear layer 51.

The ejected clear ink is flattened for a predetermined time t3 (approximately 2.0 sec.) (Step S8). Then, the clear ink spreads and becomes flat during the predetermined time (flattening time) t3. The clear ink that landed on the matte clear layer 51 is then irradiated with ultraviolet light emitted from the ultraviolet irradiator and thereby cured (Step S9). As a result, the glossy clear layer 52 is formed.

When these Steps S1 to S9 are over, the manufacture of the printed matter 100 is completed.

In the glossy mode, ink is ejected and cured so as to have a glossy texture. The "glossy" texture may indicate a glossy surface that is as smooth as almost flat and reflecting abundant light. In printing the glossy mode, the clear ink that landed on the matte clear layer 51 is left for a predetermined time t3 to flatten its ink dots, and is then irradiated with ultraviolet light emitted from the ultraviolet irradiator. By thus curing the clear ink after the ink dots are flattened, an image thereby obtained may have a surface with a glossy finish.

As illustrated in FIG. 6, the flattening time t3 before ultraviolet radiation starts and after applying the ink in forming the outermost glossy clear layer 52 is longer than the flattening times t1 and t2 set to form the colored layer 41 and the matte clear layer 51 below the glossy clear layer 52 (t1, t2<t3).

The flattening time t3 set to form the glossy clear layer 52 is thus longer than the flattening times t1 and t2 set to form the colored layer 41 and the matte clear layer 51, and time for the glossy clear layer 52 to be cured under ultraviolet radiation is longer than time for the colored layer 41 and the matte clear layer 51 to be cured under ultraviolet radiation.

FIG. 6 illustrates comparison among the flattening time t1 in Step S2, the flattening time t2 in Step S5, and the flattening time t3 in Step S8 for convenience but is irrelevant to time frames in any other steps.

Unlike the glossy clear layer 52, flattening is unnecessary for the colored layer 41 and the matte clear layer 51 which are both formed in the matte mode. Therefore, these layers may be formed in shorter time than the glossy clear layer 52. That is, while additional time is required to flatten the ink ejected in forming the glossy clear layer 52, time to form the colored layers 41 constituting the pattern and the matte clear layer 51 thereon may be reduced. This may consequently reduce overall production time for the printed matter 100.

The colored layer 41 and the matte clear layer 51 have, on their surfaces, a large number of irregularities. Such irregularities may provide an anchor effect between the colored layer 41 and the matte clear layer 51 formed thereon, and between the matte clear layer 51 and the glossy clear layer 52 formed thereon. This may increase the adhesive strength of the glossy clear layer 52 to the matte clear layer 51.

The clear layer portion 5 composed of a plurality of layers; clear layers 51 and 52, is formed on the colored layers 41 at a certain height (in a certain thickness). The pattern thus formed may impart a marked three-dimensional effect to the printed matter.

The ultraviolet-curable inks used to form the colored layers 41 and the matte clear layer 51 are fast-drying inks and are hardly spread sideward. This may ensure an adequate height (thickness) of the three-dimensional pattern (colored layers 41 and the matte clear layer 51).

By forming the pattern image by inkjet printing ejecting the ultraviolet-curable inks, the clear layers 51 and 52 shaped identically to the colored layer 41 may be accurately and exactly formed on the colored layers 41. As described thus far, the printed matter 100 may be manufactured with a high quality.

The colored layer portion 4 includes the colored layers 41 each constituting individual patterns constituting the whole three-dimensional pattern and the background layer 42 formed differently to the colored layers 41. When the background layer 42 for background is changed in color, for example, a broader range of product variations of the printed matter 100 may be feasible with the same colored layers 41 of a single pattern.

When the medium 1 is paper, for example, the background layer 42 may be formed so as to have a leather-ish texture expressing the surface of a real animal leather. Then, the Inden-ish printed matter 100 may be readily manufactured without using any genuine leather as in the traditional craftworks including Japanese Inden leather items.

In an example of the medium 1, its surface may be roughened by embossing finish so as to have a leather-ish texture. When the medium 1 having a leather-ish surface is used, instead of genuine leather, to manufacture the printed matter 100, the printed matter 100 using such a medium and having the three-dimensional pattern printed thereon may readily appear more Inden-ish.

The medium 1 may be selected from animal leathers. By using a real animal leather, the printed matter 100 may readily become even more Inden-ish in terms of texture.

<Features of Three-Dimensional Pattern>

The medium 1 may be coated with the colored layers 41 and the clear layers 51 and 52 forming the three-dimensional pattern so as to satisfy a relationship expressed by the formula, $a/A \times 100 = 15$ to $30[\%]$, where a [mm$^2$] is the summed area of the colored layers 41 and the clear layers 51 and 52, i.e., area of the whole three-dimensional pattern, and A [mm$^2$] is the surface area (unit area) of the printed matter 100.

The numerical value, "15 to 30%", is the ratio of lacquer measured on a plurality of Inden leather items. The applicant of this disclosure found out through researches that the ratio of patterns drawn on leather with lacquer in the Inden craftworks was mostly approximately 15 to 30%.

Any products with ratio of the pattern beyond the range may lose Inden-ishness, because the three-dimensional pattern may be too sparse at 15% or less or may be too crowded at 30% or above.

The numerical value "15 to 30%" in the ratio, may include errors of ±1 to 7%.

In the three-dimensional patterns of this embodiment, the ratio of the summed area "a" of the whole three-dimensional pattern to the surface area "A" of the printed matter 100 is between 15% and 30%, and the ratio of individual patterns constituting the whole three-dimensional pattern printed per unit area is between 0.5 and 3.0%. The mean ratio of the three-dimensional pattern relative to the surface area may be 1.8%, with standard deviation a, ranging from 0.5% to 1.5%. Specifically, the medium 1 may be coated with the colored layers 41 and the clear layers 51 and 52 so as to satisfy a relationship expressed by the formula, s/A×100=0.5 to 3.0 [%], where s [mm$^2$] is the area of each one of individual patterns constituting the whole three-dimensional pattern.

With the standard deviation c, being set to a ratio between 0.5% and 1.5%, variability in size between individual patterns constituting the whole three-dimensional pattern may be relatively small. The printed matter 100 in whole may be accordingly decorated with the patterns substantially uniform in size. The three-dimensional pattern, regardless of whether individual patterns constituting the whole pattern are independent from or continuous to one another, includes the colored layers 41 constructed of repetitive basic patterns and the clear layers 51 and 52 formed on the colored layers 41.

Desirably, the ratio of individual patterns constituting the whole three-dimensional pattern per unit area may be 1% to 2%, and a mean ratio of the individual patterns per unit area may be 1.5%. The standard deviation σ, at the time may desirably be between 0.5% and 1.5%. This may further reduce variability in size between respective ones of the colored layers 41 and the clear layers 51 and 52, enhancing uniformity in size among individual patterns constituting the whole three-dimensional pattern.

The three-dimensional pattern may be formed of ink having a degree of hardness after curing (pencil hardness) between 3H and H. A suitable example of the ink may be LUS-150 supplied by MIMAKI ENGINEERING CO., LTD. The colored layers 41, background layer 42, and clear layers 51 and 52, which are cured coating films formed by curing the inks, may have a degree of stretching greater than or equal to 120% when these cured coating films alone are measured at 20° C. Then, the colored layers 41 and clear layers 51 and 52 may be less likely to crack even when, for example, the printed matter 100 is under an excessive load like a bending load.

The degree of hardness (pencil hardness) of the cured ink to be used is not necessarily limited to 3H to H and may be, for example, 2H to H. In this instance, LUS-120, which is ink supplied by MIMAKI ENGINEERING CO., LTD., for example, may be used.

The "pencil hardness" described herein is based on testing methods for mechanical strength (JIS K 5400-8-4, pencil scratch hardness)

The "degree of stretching" was evaluated as described below. Pieces of cured coating films of 2×10 cm were prepared as test samples and stretched at the tension speed of 50 mm/min. by a tensile strength tester in an environment at 20° C. Then, the degree of stretching was measured based on the maximum stretchable length of each test piece without being cracked.

Specifically, two gage points were marked on each test piece at positions spaced apart from the center of the test piece (distance between the gage points was 1 cm). The degree of stretching was calculated from the formula, [(X−1)/1]×100[%], where X (cm) is an increase of the distance of the test piece between the gage points (1 cm) when the test piece was stretched.

Figure 7:
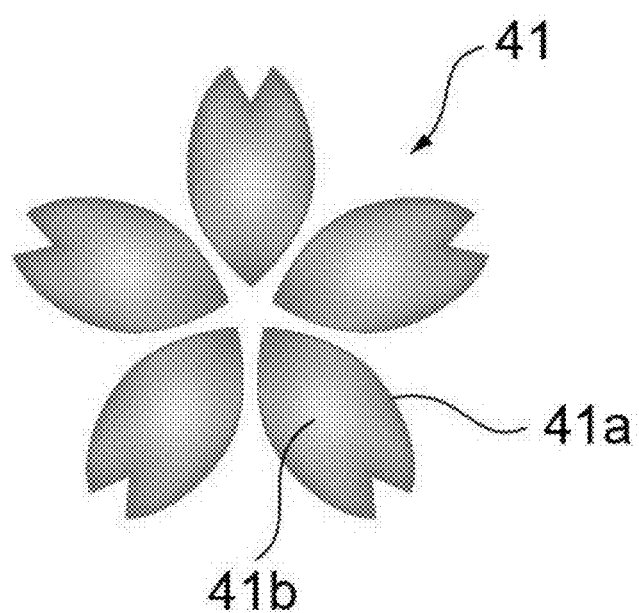
FIG. 7 is an enlarged view of the three-dimensional pattern.

Next, changes in color tone of the colored layers 41 are described referring to FIG. 7. FIG. 7 is a drawing of the colored layers 41 extracted from the three-dimensional flower pattern.

The colored layers 41 each have a peripheral part 41a constituting its contour in plan view, and an inner part 41b inside the peripheral part 41a, and the peripheral part 41a and the inner part 41b may differ in lightness. Specifically, the colored layers 41 are each formed, so that lightness increases from the peripheral part 41a toward the inner part 41b inside the peripheral part 41a.

By thus forming the colored layer 41 so that lightness increases in phases from the peripheral part 41a of the colored layer 41 toward the inner part 41b, a relatively flat pattern, for example, may appear more three-dimensional after the clear layers 51 and 52 are formed on the colored layers 41.

<Additional Remarks>

This disclosure includes but is not necessarily limited to the embodiment described thus far and may be modified without departing the scope of matters described herein. For example, the clear layer portion 5 may solely consist of the glossy clear layer 52, in which case the glossy clear layer 52 is formed on the colored layer 41.

An animal leather may be bonded to the surface of the background layer 42. This may allow the printed matter 100 to appear more Inden-ish.

An adhesive layer may be formed between the medium 1 and the colored layer portion 4. The adhesive layer may be formed of a tacky coating material curable under ultraviolet radiation and becoming adhesive when solidified (cured). To form the adhesive layer, the tacky coating material may be ejected from the inkjet printer onto the medium 1 and irradiated with ultraviolet light. The tacky coating material may be a colorless coating material having transparency and including a binder resin, acrylate.

The adhesive layer may improve the adhesive strength between the medium 1 and the colored layer portion 4.

Other examples of the inks used to form the printed matter 100 may include solvent inks containing urethane resin or epoxy resin, and two-component curable inks.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A manufacturing method for a printed matter, the printed matter comprising a medium and a three-dimensional pattern printed on a surface of the medium, the three-dimensional pattern comprising:
    a partly-coated resin portion; and layers including a colored layer and clear layers formed on the colored layer,
    the manufacturing method comprising:
        forming the three-dimensional pattern by stacking the layers formed of inks at least containing a resin on one another; and
        flattening one of the clear layers formed on an outermost surface of the three-dimensional pattern for a longer duration than at least one of the other one of the clear layers and the colored layer that are formed below the clear layer on the outermost surface, so that the one of the clear layers on the outermost surface is further flattened than at least one of the other one of the clear layers and the colored layer.

2. The manufacturing method for the printed matter according to claim 1, wherein the resin is an ultraviolet-curable resin.

3. The manufacturing method for the printed matter according to claim 2, wherein the colored layer or the clear layers are formed by an inkjet printer, and the manufacturing method further comprises adjusting an intensity of an ultraviolet radiation or a length of time before the ultraviolet-curable resin starts to be irradiated with ultraviolet light emitted from an ultraviolet radiator after the ink that forms the colored layer or the clear layers is ejected to the surface of the medium.

4. The manufacturing method for the printed matter according to claim 1, wherein the medium is flexible.

5. The manufacturing method for the printed matter according to claim 1, wherein a background layer vertically lower than an apex of the three-dimensional pattern is formed on the surface of the medium as background of the three-dimensional pattern.

6. The manufacturing method for the printed matter according to claim 5, wherein the background layer has a surface with an animal leather bonded thereto, or the background layer has a surface with an animal leather-ish texture imparted thereto by inkjet printing, the animal leather-ish texture expressing the surface of an animal leather obtained from cow, horse, pig, sheep, deer, alligator or snake.

7. The manufacturing method for the printed matter according to claim 1, wherein the three-dimensional pattern that appears Inden-ish is formed on an animal leather used as the medium or on the surface of the medium with an animal leather-ish texture expressing the surface of an animal leather obtained from cow, horse, pig, sheep, deer, alligator or snake.

8. The manufacturing method for the printed matter according to claim 1, wherein a surface of the printed matter is coated with the three-dimensional pattern by a ratio between 15% and 30% per unit area.

9. The manufacturing method for the printed matter according to claim 8, wherein the three-dimensional pattern comprises a plurality of the colored layers constructed of repetitive basic patterns and the clear layers formed on the plurality of the colored layers, and the basic pattern is formed so that the printed matter is coated with the basic pattern by a ratio between 0.5% and 3.0% per the unit area, with standard deviation ranging from 0.5% to 1.5%.

10. The manufacturing method for the printed matter according to claim 1, wherein the colored layer is formed so that, in a respective one of individual patterns constituting the three-dimensional pattern, lightness of the colored layer increases from a peripheral part of the colored layer in a plan view toward an inner part inside the peripheral part.

* * * * *